US011472324B2

(12) United States Patent
Lee et al.

(10) Patent No.: US 11,472,324 B2
(45) Date of Patent: Oct. 18, 2022

(54) COMBINATION STRUCTURE OF SEAT CUSHION FRAME

(71) Applicants: HYUNDAI MOTOR COMPANY, Seoul (KR); KIA CORPORATION, Seoul (KR); Daechang Seat Co., LTD-Dongtan, Hwaseong-si (KR); Hyundai Transys Inc., Seosan-si (KR)

(72) Inventors: Min Ju Lee, Hwaseong-si (KR); Seung Hyun Kim, Daejeon (KR); Byung Yong Choi, Hwaseong-si (KR); Sang Hyun Lee, Anyang-si (KR); Seon Chae Na, Yongin-si (KR); Chan Ki Cho, Gwangju (KR); In Chang Hwang, Hwaseong-si (KR); Dong Hwan Kim, Seoul (KR); Young Woon Choi, Hwaseong-si (KR); Jae Jin Lee, Yongin-si (KR)

(73) Assignees: HYUNDAI MOTOR COMPANY, Seoul (KR); KIA CORPORATION, Seoul (KR); Daechang Seat Co., LTD-Dongtan, Hwaseong-si (KR); Hyundai Transys Inc., Seosan-si (KR)

(*) Notice: Subject to any disclaimer, the term of this patent is extended or adjusted under 35 U.S.C. 154(b) by 0 days.

(21) Appl. No.: 17/340,652

(22) Filed: Jun. 7, 2021

(65) Prior Publication Data
US 2022/0153174 A1 May 19, 2022

(30) Foreign Application Priority Data
Nov. 13, 2020 (KR) .................. 10-2020-0152032

(51) Int. Cl.
B60N 2/30 (2006.01)
B60N 2/01 (2006.01)
B60N 2/68 (2006.01)

(52) U.S. Cl.
CPC ............... *B60N 2/682* (2013.01); *B60N 2/01* (2013.01); *B60N 2/3056* (2013.01)

(58) Field of Classification Search
CPC ........ B60N 2/3056; B60N 2/065; B60N 2/01; B60N 2/3054; B60N 2/3065; B60N 2/005; B60N 2/3043; B60N 2/3063
See application file for complete search history.

(56) References Cited

U.S. PATENT DOCUMENTS

2005/0046220 A1* 3/2005 Hernandez ........... B60N 2/4235
296/65.13
2018/0326871 A1* 11/2018 Jackson ................. B60N 2/283
2021/0070200 A1* 3/2021 Jung ...................... B60N 2/181

FOREIGN PATENT DOCUMENTS

CN 101407184 A * 4/2009 ............... B60N 2/01
DE 102005020671 B3 * 3/2006 ............. B60N 2/062

(Continued)

Primary Examiner — Timothy J Brindley
(74) Attorney, Agent, or Firm — Lempia Summerfield Katz LLC

(57) ABSTRACT

A combination structure of a seat frame includes: a first and a second side cushion frames installed on a first and a second sides of a seat, and configured to slide forward and rearward, wherein the first and the second sides of the seat are opposite to each other; a center cushion frame provided between the side cushion frames and having a first side fixed to the first side cushion frame; and a support guide device connected between a second side of the center cushion frame and the second side cushion frame, and configured to guide a sliding movement of each of the second side cushion frame and the center cushion frame while supporting weights of the second side cushion frame and the center cushion frame.

10 Claims, 5 Drawing Sheets

(56) References Cited

FOREIGN PATENT DOCUMENTS

| | | | | |
|---|---|---|---|---|
| EP | 3403874 | A1 * | 11/2018 | ............. B60N 2/005 |
| FR | 2877280 | A1 * | 5/2006 | ............... B60N 2/06 |
| FR | 3108277 | A1 * | 9/2021 | |
| KR | 10-2141904 | | 8/2020 | |
| WO | WO-9942321 | A1 * | 8/1999 | ........... B60N 2/0224 |

* cited by examiner

COMBINATION STRUCTURE OF SEAT CUSHION FRAME

CROSS REFERENCE TO RELATED APPLICATION

This application claims priority to and the benefit of Korean Patent Application No. 10-2020-0152032, filed on Nov. 13, 2020, the entire contents of which are incorporated herein by reference.

FIELD

The present disclosure relates to a combination structure of a seat cushion frame.

BACKGROUND

The statements in this section merely provide background information related to the present disclosure and may not constitute prior art.

In the case of a rear seat applied to a luxury vehicle, a seat back and a seat cushion are connected to each other by a hinge structure. Accordingly, when an angle of the seat back is tilted backward, the seat back is tilted backward and the seat cushion slides forward, so that a passenger in the rear seat can take a relaxing position for rest or sleeping.

According, in the case of the rear seat in which the angle of the seat back is adjusted together with the sliding of the seat, the rear seat is divided into a ratio of 6:4 to inhibit excessive increase in the material cost and weight of the rear seat.

For example, in a rear seat, a seat cushion frame and a seat back frame forming a left side seat and a center seat fixed to each other, and a seat cushion frame and a seat back frame forming a separate right side seat may be configured to be divided from each other.

Meanwhile, a rear floor located under the center seat of the rear seat is configured to have a shape protruding upward and the center seat has an insufficient package space thereunder, which results to the weakness of a structure supporting the cushion frame of the center seat.

Accordingly, in a case in which three passengers are seated in the rear seat, the weight of a passenger seated in a center seat is concentrated on the cushion frame of the center seat, so the deformation of the cushion frame of the center seat such as sagging may occur.

The foregoing is intended merely to aid in the understanding of the background of the present disclosure, and is not intended to mean that the present disclosure falls within the purview of the related art that is already known to those skilled in the art.

SUMMARY

The present disclosure provides a combination structure of a seat cushion frame, in which the rigidity of the cushion frame of a center seat of a vehicle is reinforced to inhibit the sagging and deformation of the cushion frame due to a passenger's weight.

According to one aspect of the present disclosure, a combination structure of a seat cushion frame includes: a first and a second side cushion frames installed on a first and a second sides of a seat, and configured to slide forward and rearward, wherein the first and the second sides of the seat are opposite to each other; a center cushion frame provided between the side cushion frames and having a first side fixed to the first side cushion frame; and a support guide device connected between a second side of the center cushion frame and the second side cushion frame, and configured to guide a sliding movement of each of the second side cushion frame and the center cushion frame while supporting weights of the second side cushion frame and the center cushion frame.

The support guide device may include: a guide bracket fixed to a vehicle body and having a longitudinal slot formed therein in a front-to-rear direction of the guide bracket; a center sliding pin having a first end fixed to the center cushion frame and having a second end configured to slide along the longitudinal slot of the guide bracket in the front-to-rear direction; and a side sliding pin having a first end fixed to the second side cushion frame and having a second end configured to slide along the longitudinal slot of the guide bracket in the front-to-rear direction.

To support the side cushion frames, the combination structure may further include a leg bracket fixed to the vehicle body, and the guide bracket may be coupled to the leg bracket.

The combination structure may further include a lower bracket forming the guide bracket coupled to the leg bracket.

The longitudinal slot of the guide bracket may include a plurality of slots formed in opposite sides of the guide bracket, wherein the center sliding pin may be inserted into a first slot of the plurality of slots, and the side sliding pin may be inserted into a second slot of the plurality of slots a predetermined interval from the center sliding pin.

The guide bracket may include: a lower bracket fixed to the vehicle body and having a first lower groove formed on a first side the lower bracket and a second lower groove formed on a second side of the lower bracket along the front-to-rear direction, wherein the side sliding pin is seated in the first lower groove and the center sliding pin is seated in the second lower groove; and an upper bracket formed to have a shape covering the lower bracket. The upper bracket may have: a first upper groove formed on a first side the upper bracket along the front-to-rear direction, having a shape corresponding to a shape of the first lower groove, and configured to cover the side sliding pin; and a second upper groove formed on a second side of the a second upper groove formed on a second side of the upper bracket along the front-to-rear direction, having a shape corresponding to a shape of the second lower groove, and configured to cover the center sliding pin.

The lower bracket and the upper bracket may be hinged to each other at first ends thereof and may be bolted to each other at second ends thereof.

The upper bracket may include opposite inner surfaces and the lower bracket may be include opposite outer surfaces, wherein the opposite inner surfaces of the upper bracket is configured to be fitted over and cover the opposite outer surfaces of the lower bracket.

The guide bracket may further include a bush coupled to an inner surface of the longitudinal slot.

The support guide device may include: a first stepped part formed on each of the second end of the side sliding pin and the second end of the center sliding pin, and having a diameter larger than a height of the longitudinal slot of the guide bracket; a second stepped part formed on each of a middle part of the side sliding pin and a middle part of the center sliding pin, and having a diameter larger than the height of the longitudinal slot of the guide bracket; and a section between the first stepped part and the second stepped part may be located in the longitudinal slot of the guide bracket, so that the side sliding pin and the center sliding pin may slide.

According to the combination structure of the present disclosure, the support guide device is connected to the center cushion frame and the side cushion frame therebetween which are divided from each other, and supports the cushion frames located at the opposite sides of the support guide device, whereby when a passenger sits in the center seat, the passenger's weight applied to the center cushion frame is distributed to the cushion frames located at the opposite sides of the support guide device. Accordingly, the rigidity of the center cushion frame is reinforced, thereby inhibiting the sagging and deformation of the center cushion frame due to the passenger's weight.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
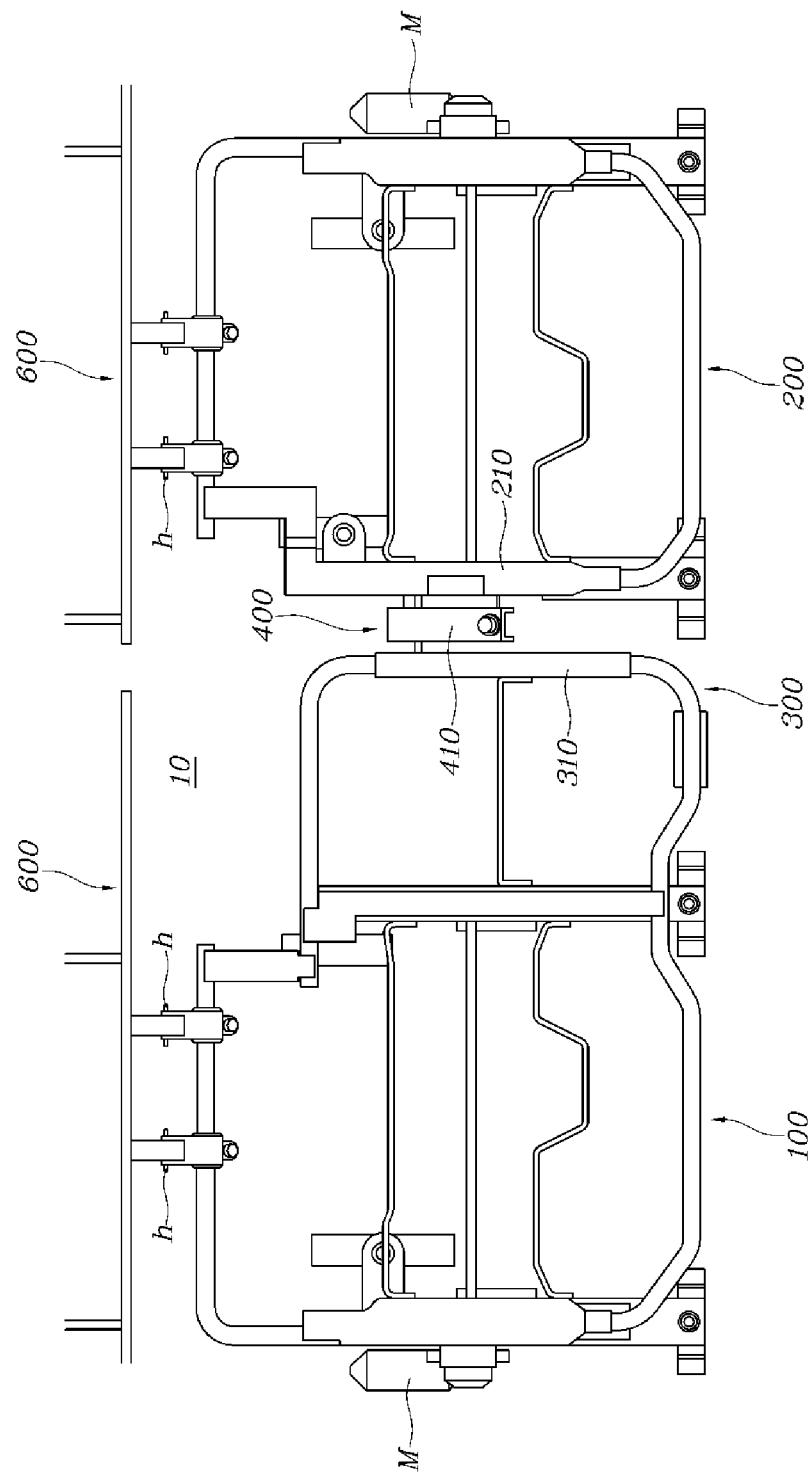
FIG. 1 is a view illustrating a combination relation between a seat cushion frame and a support guide device according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, various forms of the present disclosure will be described in detail with reference to the accompanying drawings.

FIG. 1 is a view illustrating a combination relation between a seat cushion frame and a support guide device according to one form of the present disclosure.

Referring to FIG. 1, a seat applied to the present disclosure may be a three-person seat installed in the rear of a passenger vehicle and divided into a ratio of 6:4 in left and right, wherein the angle of a seat back is adjusted according to the front to rear sliding operation of the seat.

Accordingly, the configuration of the seat will be described briefly. A plurality of cushion frames 100, 200, and 300 forming the frames of seat cushions is provided inside the seat cushions, and a motor M supplying a front-to-rear sliding operation force to the cushion frames 100, 200, and 300, and to the seat cushions is provided.

For example, the motor M is fixed to the seat cushions; a worm gear is coupled to a shaft of the motor M; and the worm gear is engaged with a rack gear fixed to a vehicle body 10, whereby during the operation of the motor M, the driving force of the motor M is transmitted to the cushion frames 100, 200, and 300 through a gear engagement structure, so the seat cushions slide forward and rearward.

In addition, the rear end of each of the cushion frames 100, 200, and 300 is hinged to the lower end of a back frame 600 provided inside each of seat backs, and the upper end of the back frame 600 is hinged to the vehicle body 10, so the angle of the seat back is adjusted according to the sliding of each of the seat cushions.

Meanwhile, the combination structure of the cushion frame for the seat, the seat being continuously connected from side to side to be divided into a predetermined ratio as described above, includes: side cushion frames 100 and 200 installed on the opposite sides of the seat and configured to slide forward and rearward; a center cushion frame 300 provided between the side cushion frames 100 and 200 and having a first side fixed to a first side cushion frame 100 of the side cushion frames; and the support guide device 400 connected between a second side of the center cushion frame 300 and a second side cushion frame 200 of the side cushion frames and configured to guide a sliding movement of each of the second side cushion frame 200 and the center cushion frame 300 while supporting weights thereof.

For example, the side cushion frames 100 and 200 are formed to have rectangular shapes and form the frame of a left seat cushion and the frame of a right seat cushion, respectively. The center cushion frame 300 is formed to have a rectangular shape smaller than the rectangular shape of each of the side cushion frames 100 and 200, and forms the frame of a center seat cushion and is fixed to the first side cushion frame 100.

In addition, the center cushion frame 300 and the second side cushion frame 200 are installed by being spaced by a predetermined interval apart from each other. The support guide device 400 is installed in the interval in a front to rear direction thereof, and the center cushion frame 300 and the second side cushion frame 200 are configured to be supported by the opposite surfaces of the support guide device 400, each of the center cushion frame 300 and the second side cushion frame 200 facing the support guide device.

That is, the support guide device 400 is connected between the center cushion frame 300 and the second side cushion frame 200 and supports the center cushion frame 300 and the second side cushion frame 200, whereby when a passenger sits in a center seat, a passenger's weight applied to the center cushion frame 300 is distributed to the first side cushion frame 100, and due to the support guide device 400, is distributed also to the second side cushion frame 200.

Accordingly, the rigidity of the center cushion frame 300 is reinforced and inhibited from being sagged and deformed due to a passenger's weight.

Figure 2:
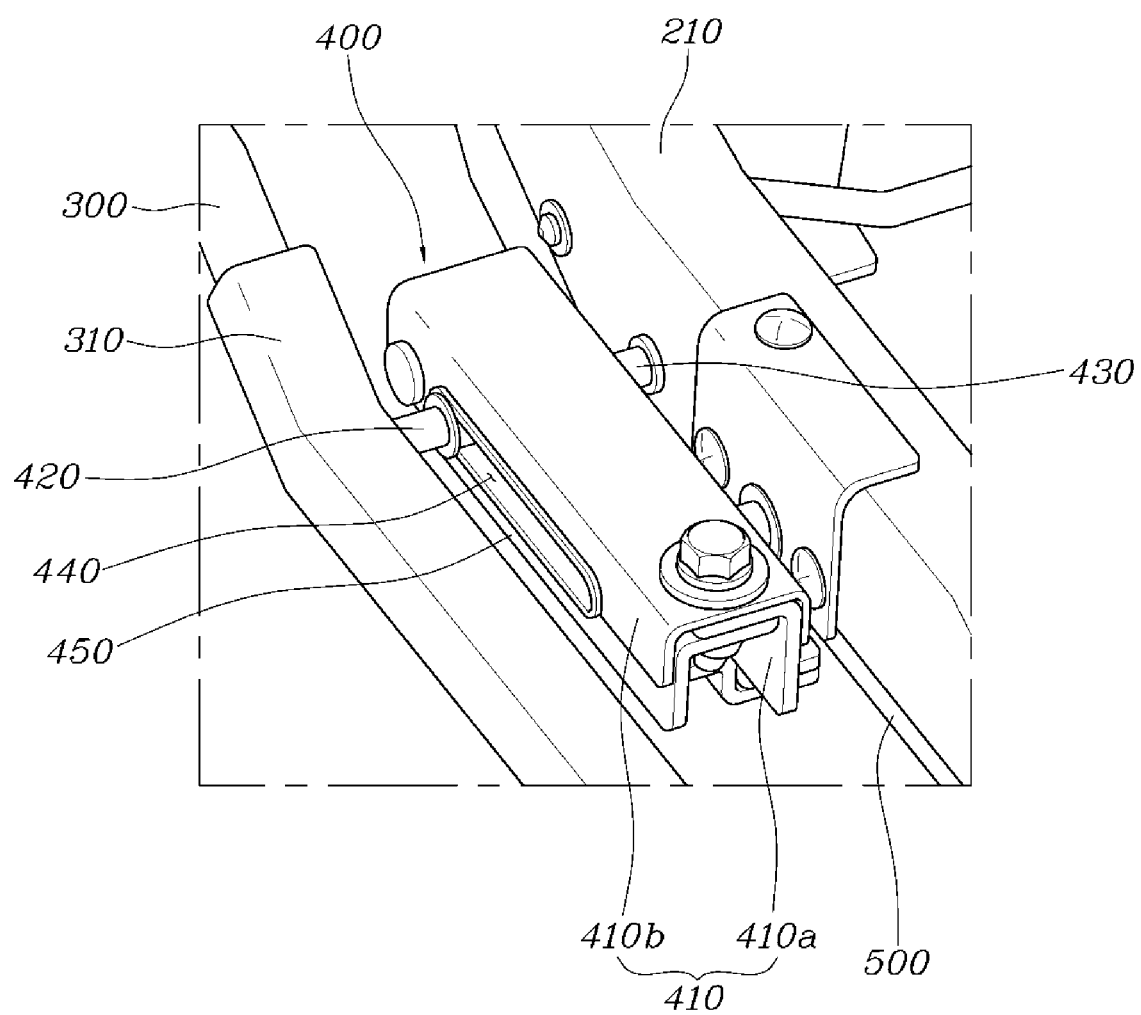
FIG. 2 is a view illustrating the shape of the support guide device according to one form of the present disclosure.

Meanwhile, FIG. 2 is a view illustrating the shape of the support guide device 400 according to one form of the present disclosure.

The configuration of the support guide device 400 will be described in detail with reference to FIG. 2. The support guide device 400 includes: a guide bracket 410 fixed to the vehicle body 10 and having a longitudinal slot 440 formed therein in a front to rear direction thereof; a center sliding pin 420 having an first end fixed to the center cushion frame 300 and having a second end configured to slide along the longitudinal slot 440 of the guide bracket in the front to rear direction; and a side sliding pin 430 having a first end fixed to the second side cushion frame 200 and having a second end configured to slide along the longitudinal slot 440 of the guide bracket in the front to rear direction.

For example, a fixing bracket 310 is fixed to a side surface of the center cushion frame 300 facing a first side of the support guide device 400, and the first end of the center sliding pin 420 is welded to the fixing bracket 310.

In addition, the fixing bracket 210 is fixed to a side surface of the second side cushion frame 200 facing a second side of the support guide device 400, and the first end of the side sliding pin 430 is welded to the fixing bracket 210.

Particularly, the center sliding pin 420 and the side sliding pin 430 are inserted into a plurality of slots 440 formed in the opposite sides of the guide bracket 410, respectively. Accordingly, during the front-to-rear sliding of the seat cushion, the center sliding pin 420 and the side sliding pin 430 support the center cushion frame 300 and the second side cushion frame 200, respectively, while sliding along the slots 440. Even during the sliding process of the seat cushion, the center sliding pin 420 and the side sliding pin 430 distribute a passenger's weight applied to the center cushion frame 300 left and right, and inhibit the sagging and deformation of the center cushion frame 300.

Figure 3:
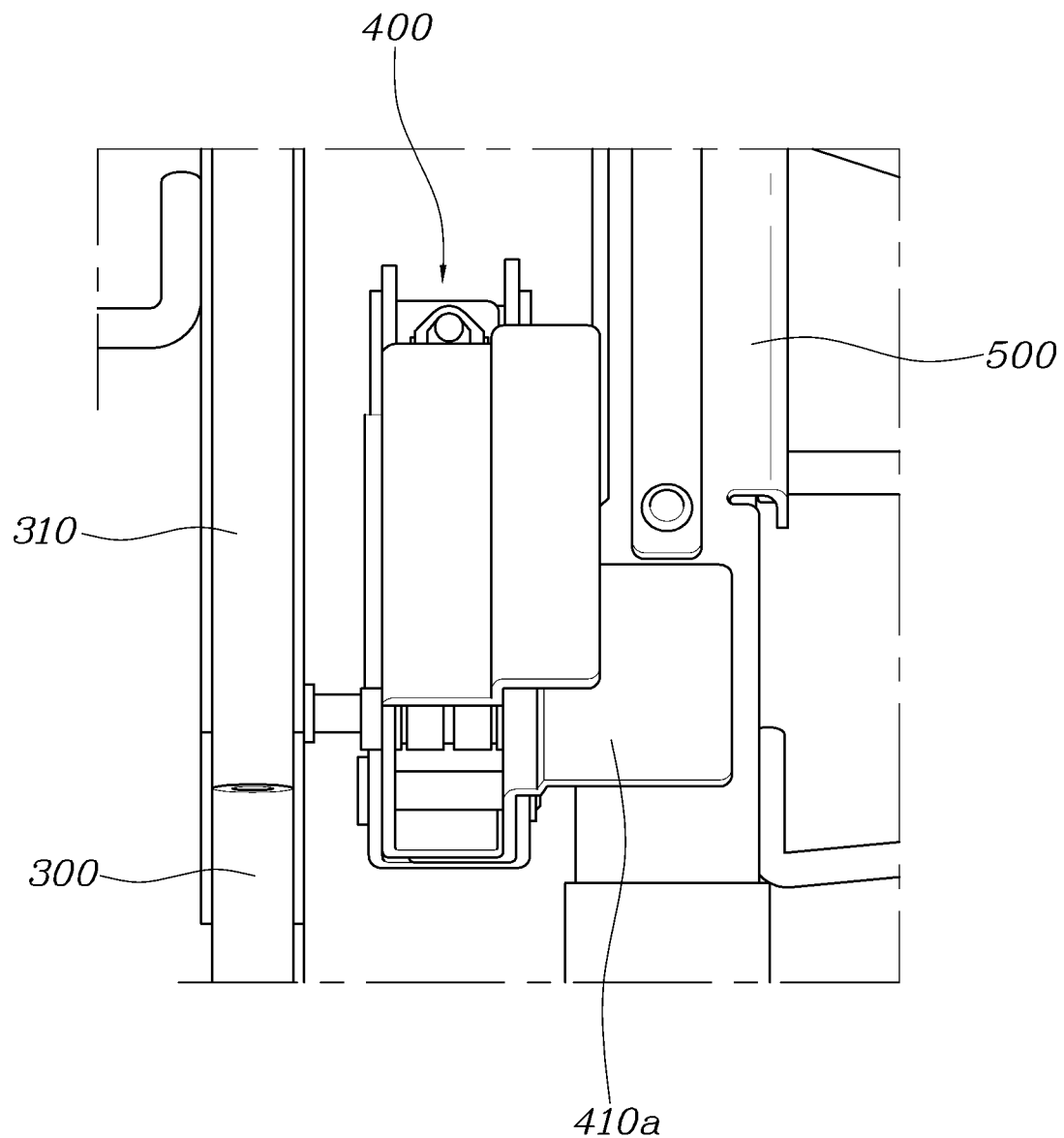
FIG. 3 is a view illustrating a combining relation in which a guide bracket is fixed to a vehicle body according to one form of the present disclosure.

In addition, FIG. 3 is a view illustrating a combining relation in which the guide bracket 410 is fixed to the vehicle body 10 according to one form of the present disclosure.

Referring to FIG. 3, to support the side cushion frames 100 and 200, a leg bracket 500 may be fixed to the vehicle body 10, and the guide bracket 410 may be coupled to the leg bracket 500.

For example, the leg bracket 500 is fixed to the rear floor located under the side cushion frames 100 and 200 and the center cushion frame 300, and the guide bracket 410 is fixed to the lower surface of the leg bracket 500, so the guide bracket 410 is fixed to the vehicle body 10. For reference, the guide bracket 410 includes a lower bracket 410a and an upper bracket 410b. The lower bracket 410a is formed by extending to the leg bracket 500, and may be welded to the lower surface of the leg bracket 500.

Figure 4:
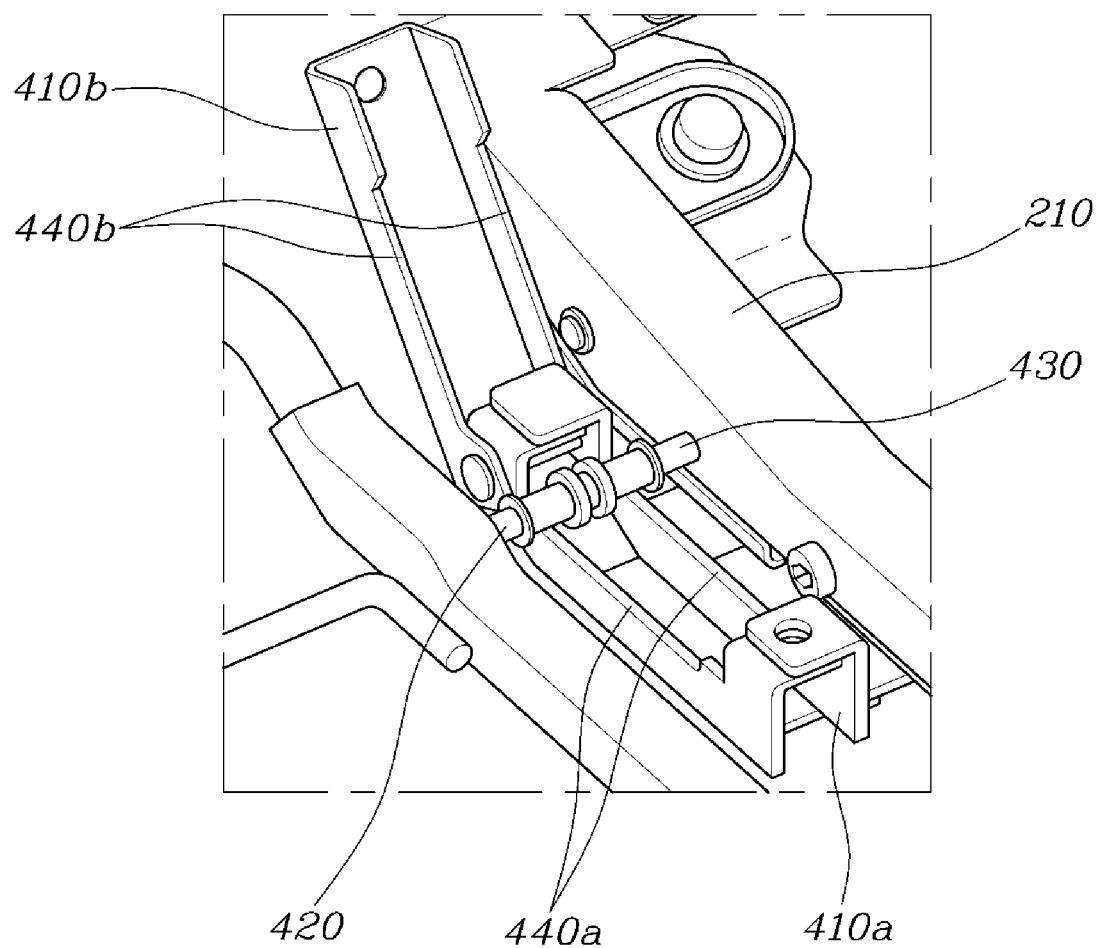
FIG. 4 is a view illustrating a structure in which sliding pins are coupled to the slot of the guide bracket according to one form of the present disclosure.
Figure 5:
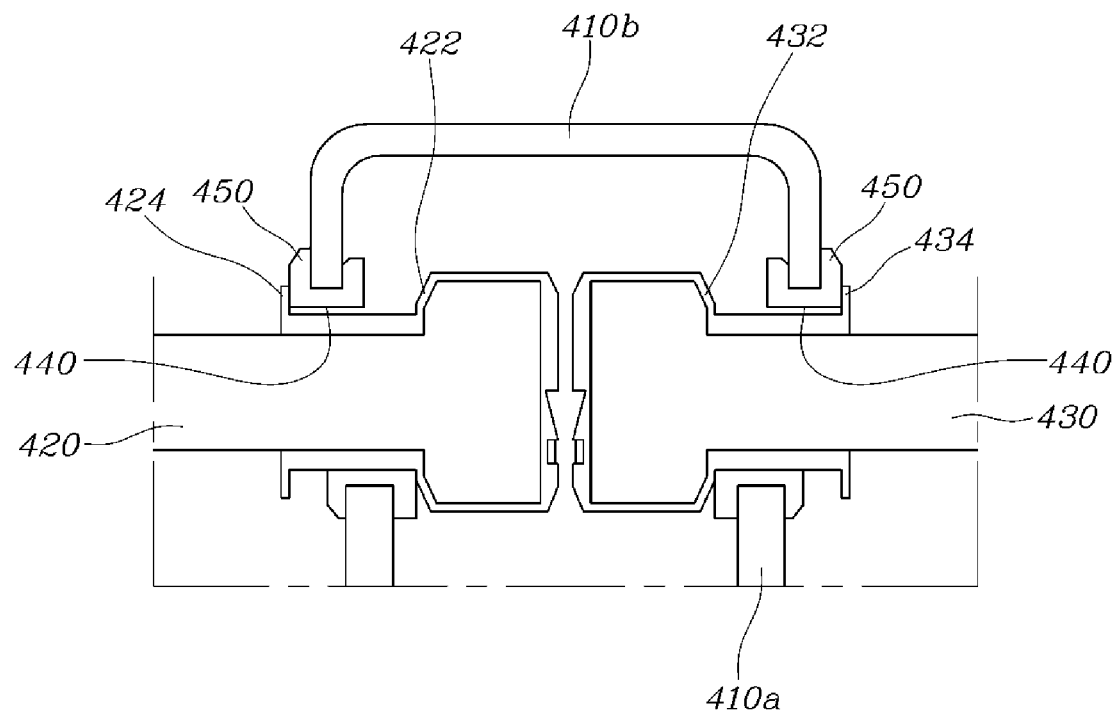
FIG. 5 is a view illustrating a structure in which the sliding pins are inserted into the guide bracket according to one form of the present disclosure.

Meanwhile, FIG. 4 is a view illustrating a structure in which sliding pins are coupled to the slot 440 of the guide bracket 410 according to one form of the present disclosure, and FIG. 5 is a view illustrating a structure in which the sliding pins are inserted into the guide bracket 410.

Referring to FIG. 4, the slot 440 of the guide bracket includes the plurality of slots formed in the opposite sides of the guide bracket 410, wherein the center sliding pin 420 is inserted into a first slot 440 of the slots, and the side sliding pin 430 is inserted into a second slot 440 of the slots by being spaced apart from the center sliding pin 420 by a predetermined interval.

That is, the center sliding pin 420 and the side sliding pin 430 are provided separately from each other in the slots 440 formed in the opposite sides of the guide bracket 410. Accordingly, the center sliding pin 420 and the side sliding pin 430 may individually guide and support the front-to-rear sliding movements of the seat cushion supported by the center sliding pin 420 and the seat cushion supported by the side sliding pin 430, respectively.

In addition, as illustrated in FIG. 4, the guide bracket 410 includes: the lower bracket 410a fixed to the vehicle body 10 and having a lower groove 440a formed on each of middle parts of opposite sides of the lower bracket along a front to rear longitudinal direction thereof such that the side sliding pin 430 and the center sliding pin 420 are seated in the lower grooves formed on the opposite sides of the lower bracket, respectively; and the upper bracket 410b formed to have a shape covering the lower bracket 410a and having an upper groove 440b formed on each of middle parts of opposite sides of the upper bracket along the front to rear longitudinal direction to have a shape corresponding to a shape of the lower groove 440a such that the upper bracket covers the side sliding pin 430 and the center sliding pin 420 seated in the lower bracket 410a.

For example, after each of the side sliding pin 430 and the center sliding pin 420 is seated in the lower groove 440a formed in each of the opposite sides of the lower bracket 410a, the upper bracket 410b covers the upper side of the lower bracket 410a to be combined with each other, so the assembling of the guide bracket 410 is performed.

Particularly, the lower groove 440a formed in the lower bracket 410a forms the lower part of the slot 440, and the upper groove 440b formed in the upper bracket 410b forms the upper part of the slot 440 such that the longitudinal slot 440 is formed, whereby the center sliding pin 420 and the side sliding pin 430 can slide along the slot 440.

In addition, the lower bracket 410a and the upper bracket 410b are hinged to each other at first ends thereof and are bolted to each other at second ends thereof.

That is, the second end of the upper bracket 410b is rotated relative to the hinge of the first end of each of the lower bracket 410a and the upper bracket 410b, so the second end of the upper bracket 410b covers the second end of the lower bracket 410a and is bolted thereto. Accordingly, the combination of the lower bracket 410a and the upper bracket 410b with each other is simply performed, so the rigidity of the center cushion frame 300 can be reinforced without significantly increasing an assembly man-hour.

In addition, referring to FIG. 2, the upper bracket and the lower bracket are configured such that opposite inner surfaces of the upper bracket 410b are fitted over opposite outer surfaces of the lower bracket 410a to cover the opposite outer surfaces of the lower bracket 410a.

That is, a section of each of the upper bracket 410b and the lower bracket 410a is configured to have a U shape open in a lower part thereof. The upper bracket 410b is configured to have a width between opposite surfaces thereof longer than the width of opposite surfaces of the lower bracket 410a, so the upper bracket 410b is combined with the lower bracket 410a such that the lower bracket 410a has a shape being fitted into the upper bracket 410b.

In addition, FIG. 5 is a view illustrating a structure in which the sliding pins are inserted into the guide bracket 410 according to the present disclosure.

Referring to FIG. 5, a bush 450 may be coupled to an inner surface of the longitudinal slot 440 of the guide bracket therealong.

That is, the bush 450 is coupled to the slot 440 therealong, so a gap between the slot 440 and the sliding pin is maintained, whereby frictional noise between the sliding pin and the guide bracket 410 which are made of steel materials is inhibited.

In addition, first stepped parts 422 and 432 are formed on the second end of the center sliding pin 420 and the second end of the side sliding pin 430, respectively, each of the first stepped parts having a diameter larger than the height of the longitudinal slot 440 of the guide bracket, and second stepped parts 424 and 434 are formed on a middle part of the center sliding pin 420 and a middle part of the side sliding pin 430, respectively, each of the second stepped parts having a diameter larger than the height of the longitudinal slot 440 of the guide bracket.

Furthermore, each of sections between the first stepped parts 422 and 432 and the second stepped parts 424 and 434 is located in the slot 440, so that the side sliding pin 430 and the center sliding pin 420 slide.

That is, the sliding pins are held in the slots 440 by the first stepped parts 422 and 432 and the second stepped parts 424 and 434, so the sliding pins are not removed from the guide bracket 410, and can stably slide along the slots 440.

As described above, according to some forms of the present disclosure, the support guide device 400 connects the center cushion frame 300 to the side cushion frame 200 therebetween, the center cushion frame and the side cushion frame being divided from each other, and supports the cushion frames located at the opposite sides of the support guide device 400. Accordingly, when a passenger sits in the center seat, the passenger's weight applied to the center cushion frame 300 is distributed to the side cushion frame by the support guide device 400. Accordingly, the rigidity of the center cushion frame 300 is reinforced and the sagging and deformation of the center cushion frame 300 due to the passenger's weight are inhibited.

Although various forms of the present disclosure has been described for illustrative purposes, those skilled in the art will appreciate that various modifications, additions and substitutions are possible, without departing from the scope and spirit of the present disclosure.

What is claimed is:

1. A combination structure of a seat cushion frame, the combination structure comprising:
    a first side cushion frame and a second side cushion frame respectively installed on a first side and a second side of a seat and each configured to slide forward and rearward, wherein the first and the second sides of the seat are opposite to each other;
    a center cushion frame provided between the first and the second side cushion frames, and having a first side fixed to the first side cushion frame; and
    a support guide device connected between a second side of the center cushion frame and the second side cushion frame, and configured to guide a sliding movement of each of the second side cushion frame and the center cushion frame while supporting weights of the second side cushion frame and the center cushion frame.

2. The combination structure of claim 1, wherein the support guide device comprises:
    a guide bracket fixed to a vehicle body and having a longitudinal slot formed therein in a front-to-rear direction of the guide bracket;
    a center sliding pin having a first end fixed to the center cushion frame and having a second end configured to slide along the longitudinal slot of the guide bracket in the front-to-rear direction; and
    a side sliding pin having a first end fixed to the second side cushion frame and having a second end configured to slide along the longitudinal slot of the guide bracket in the front-to-rear direction.

3. The combination structure of claim 2, further comprising: a leg bracket fixed to the vehicle body,
    wherein the guide bracket is coupled to the leg bracket.

4. The combination structure of claim 3, further comprising: a lower bracket forming the guide bracket and coupled to the leg bracket.

5. The combination structure of claim 2, wherein:
    the longitudinal slot of the guide bracket comprises: a plurality of slots formed in opposite sides of the guide bracket,
    the center sliding pin is inserted into a first slot of the plurality of slots, and
    the side sliding pin is inserted into a second slot of the plurality of slots at a predetermined interval from the center sliding pin.

6. The combination structure of claim 2, wherein the guide bracket comprises:
    a lower bracket fixed to the vehicle body and having a first lower groove formed on a first side of the lower bracket and a second lower groove formed on a second side of the lower bracket along the front-to-rear direction, wherein the side sliding pin is seated in the first lower groove and the center sliding pin is seated in the second lower groove; and
    an upper bracket configured to cover the lower bracket, and including:
        a first upper groove formed on a first side of the upper bracket along the front-to-rear direction, having a shape corresponding to a shape of the first lower groove, and configured to cover the side sliding pin; and
        a second upper grooved formed on a second side of the upper bracket along the front-to-rear direction, having a shape corresponding to a shape of the second lower groove, and configured to cover the center sliding pin.

7. The combination structure of claim 6, wherein the lower bracket and the upper bracket are hinged to each other at first ends thereof and are bolted to each other at second ends thereof.

8. The combination structure of claim 6, wherein:
    the upper bracket comprises opposite inner surfaces and the lower bracket comprises opposite outer surfaces, and
    the opposite inner surfaces of the upper bracket are configured to be fitted over and cover the opposite outer surfaces of the lower bracket.

9. The combination structure of claim 2, wherein the guide bracket further comprises: a bush coupled to an inner surface of the longitudinal slot.

10. The combination structure of claim 9, wherein the support guide device further comprises:
    a first stepped part formed on each of the second end of the side sliding pin and the second end of the center sliding pin, and having a diameter larger than a height of the longitudinal slot of the guide bracket; and
    a second stepped part formed on each of a middle part of the side sliding pin and a middle part of the center sliding pin, and having a diameter larger than the height of the longitudinal slot of the guide bracket,
    wherein a section between the first stepped part and the second stepped part is located in the longitudinal slot of the guide bracket.

* * * * *